(12) United States Patent
Zhong et al.

(10) Patent No.: US 12,378,999 B2
(45) Date of Patent: Aug. 5, 2025

(54) INSULATED BEARING

(71) Applicant: Schaeffler Technologies AG & Co. KG, Herzogenaurach (DE)

(72) Inventors: Guihui Zhong, Charlotte, NC (US); John Tate, Cornelius, NC (US); Charles Schwab, Fort Mill, SC (US); Michael Heaton, Rock Hill, SC (US); Venkata Kottapalli, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 159 days.

(21) Appl. No.: 18/080,823

(22) Filed: Dec. 14, 2022

(65) Prior Publication Data

US 2024/0200609 A1  Jun. 20, 2024

(51) Int. Cl.
*F16C 35/077* (2006.01)
*F16C 33/58* (2006.01)
*F16C 35/04* (2006.01)

(52) U.S. Cl.
CPC .......... *F16C 35/077* (2013.01); *F16C 33/586* (2013.01); *F16C 35/042* (2013.01); *F16C 2223/70* (2013.01)

(58) Field of Classification Search
CPC .... F16C 19/525; F16C 33/586; F16C 35/042; F16C 35/077; F16C 2223/70
See application file for complete search history.

(56) References Cited

U.S. PATENT DOCUMENTS

| | | | |
|---|---|---|---|
| 8,764,301 B2 | 7/2014 | Winkelmann et al. | |
| 9,653,193 B2 | 5/2017 | Windrich et al. | |
| 10,794,427 B2 * | 10/2020 | White | F16C 33/62 |
| 11,486,445 B2 * | 11/2022 | Berruet | F16C 35/077 |
| 11,549,556 B2 * | 1/2023 | Berruet | F16C 19/52 |
| 11,767,884 B2 * | 9/2023 | Zhong | F16C 33/586 |
| | | | 384/572 |

(Continued)

FOREIGN PATENT DOCUMENTS

| | | | | |
|---|---|---|---|---|
| JP | 5-346138 | * | 12/1993 | |
| JP | 2007002946 A | * | 1/2007 | ............ F16C 27/066 |

OTHER PUBLICATIONS

Unpublished U.S. Appl. No. 18/073,619 Author: Schaeffler Technologies AG & Co. KG Date: Dec. 2, 2022 Country: United States.

(Continued)

*Primary Examiner* — James Pilkington
(74) *Attorney, Agent, or Firm* — Matthew V. Evans

(57) ABSTRACT

An insulated bearing includes an outer ring, a plurality of rolling elements, a first aluminum insulating cap, and a second aluminum insulating cap. The outer ring has an inner rolling surface and an outer spiral groove, and the plurality of rolling elements are in rolling contact with the inner rolling surface. The first aluminum insulating cap screwed onto the outer ring from a first axial end. The first aluminum insulating cap has a first inner spiral, complementary to the outer spiral groove. The second aluminum insulating cap is screwed onto the outer ring from a second axial end, opposite the first axial end. The second aluminum insulating cap has a second inner spiral, complementary to the outer spiral groove.

15 Claims, 2 Drawing Sheets

(56) References Cited

U.S. PATENT DOCUMENTS

| | | | |
|---|---|---|---|
| 2016/0053812 A1* | 2/2016 | Varnoux | F16C 25/08 |
| | | | 384/493 |
| 2016/0238074 A1 | 8/2016 | Preis et al. | |
| 2021/0310520 A1* | 10/2021 | Arnault | F16C 35/077 |
| 2023/0122158 A1 | 4/2023 | Zhong et al. | |
| 2024/0183399 A1 | 6/2024 | Zhong et al. | |

OTHER PUBLICATIONS

Unpublished U.S. Appl. No. 17/501,441 Author: Schaeffler Technologies AG and Co. KG Date: Oct. 14, 2021 Country: United States.

* cited by examiner

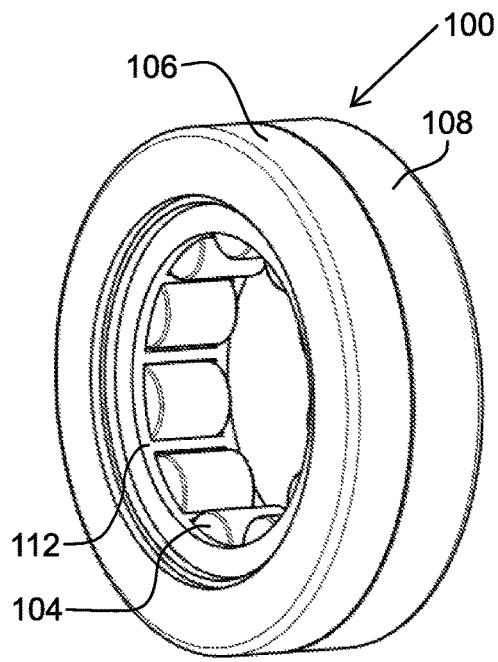
Fig. 2
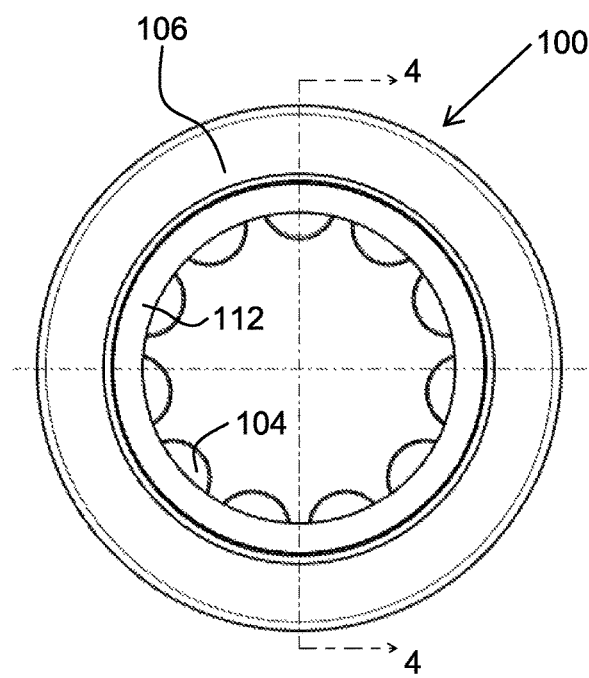
Fig. 3
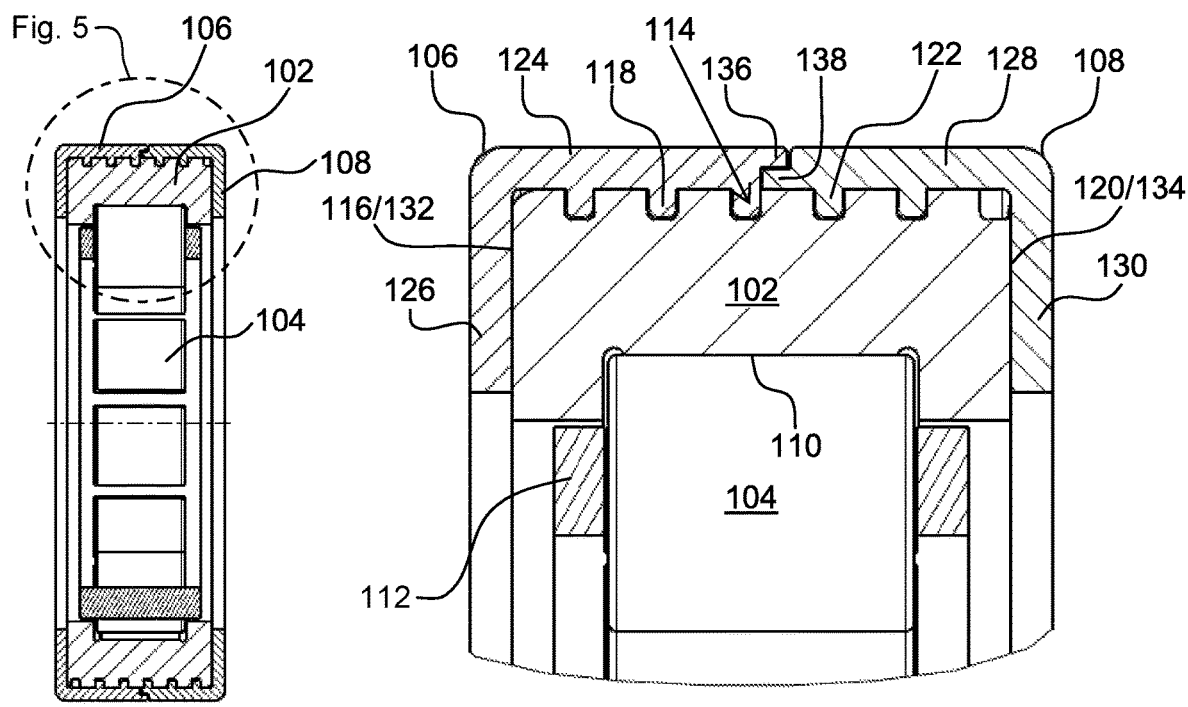
Fig. 4
Fig. 5

INSULATED BEARING

TECHNICAL FIELD

The present disclosure relates generally to a bearing, and more specifically to an insulated bearing.

BACKGROUND

Insulated bearings are known. One example is shown and described in commonly-assigned U.S. Pat. No. 8,764,301 titled THERMALLY INSULATED ANTI-FRICTION BEARING to Winkelmann et al., hereby incorporated by reference as if set forth fully herein.

SUMMARY

Example embodiments broadly comprise an insulated bearing having an outer ring, a plurality of rolling elements, a first aluminum insulating cap, and a second aluminum insulating cap. The outer ring has an inner rolling surface and an outer spiral groove, and the plurality of rolling elements are in rolling contact with the inner rolling surface. The first aluminum insulating cap screwed onto the outer ring from a first axial end. The first aluminum insulating cap has a first inner spiral, complementary to the outer spiral groove. The second aluminum insulating cap is screwed onto the outer ring from a second axial end, opposite the first axial end. The second aluminum insulating cap has a second inner spiral, complementary to the outer spiral groove.

In an example embodiment, the outer spiral groove has a cross-section with a shape selected from the group consisting of a rectangle, a triangle, and a trapezoid. In some example embodiments, the first aluminum insulating cap and the second aluminum insulating cap are each hard coat anodized. In some example embodiments, the first aluminum insulating cap and the second aluminum insulating cap each have two layers of hard coat anodization. In an example embodiment, the two layers are an inner layer and an outer layer. In some example embodiments, the hard coat anodizing forms an oxidization layer. In an example embodiment, the oxidization layer is between 40 µm and 60 µm thick. In some example embodiments, the insulated bearing also has an insulating epoxy between each of the aluminum insulating caps and the outer ring. In an example embodiment, the insulating epoxy is applied to the outer spiral groove.

In some example embodiments, each aluminum insulating cap has a cylindrical portion and an annular portion. The inner spiral protrudes radially inward from the cylindrical portion and the annular portion extends radially inward from the cylindrical portion. In some example embodiments, the outer ring includes axially opposite annular surfaces, and each of the aluminum insulating caps is screwed onto the outer ring until the respective annular portion contacts a one of the axially opposite annular surfaces. In an example embodiment, the insulated bearing also includes an insulating epoxy between each of the aluminum insulating caps and the outer ring. In the example embodiment, the insulating epoxy is applied to the outer spiral groove and each of the axially opposite annular surfaces.

In an example embodiment, each of the plurality of rolling elements is a cylinder, a sphere, a needle, or a tapered roller. In an example embodiment, the first aluminum insulating cap also has a distal overlap portion and the second aluminum insulating cap also has a distal underlap portion. In the embodiment, the distal overlap portion and the distal underlap portion cooperate to provide a mating joint between the first aluminum insulating cap and the second aluminum insulating cap.

BRIEF DESCRIPTION OF THE DRAWINGS

FIG. 2 illustrates a perspective view of the insulated bearing of FIG. 1.

FIG. 3 illustrates a side view of the insulated bearing of FIG. 1.

FIG. 4 illustrates a section view of the insulated bearing of FIG. 3 taken generally along line 4-4 in FIG. 3.

FIG. 5 illustrates a detail view of encircled region 5 in FIG. 4.

DETAILED DESCRIPTION

Figure 1:
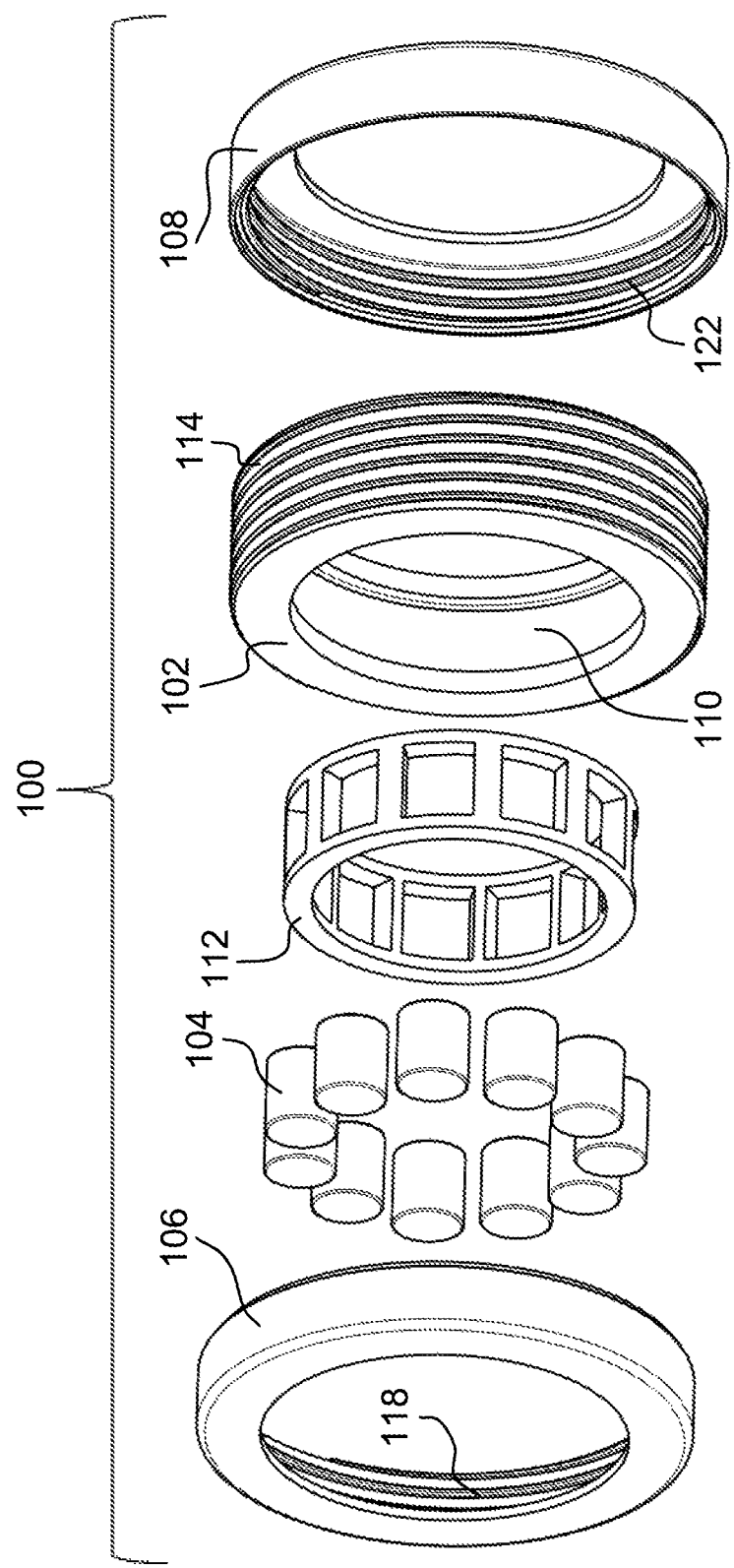
FIG. 1 illustrates a perspective exploded view of an insulated bearing according to an example embodiment.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following disclosure is made with reference to FIGS. 1-5. FIG. 1 illustrates a perspective exploded view of insulated bearing 100. FIG. 2 illustrates a perspective view of the insulated bearing of FIG. 1. FIG. 3 illustrates a side view of the insulated bearing of FIG. 1. FIG. 4 illustrates a section view of the insulated bearing of FIG. 3 taken generally along line 4-4 in FIG. 3. FIG. 5 illustrates a detail view of encircled region 5 in FIG. 4. Insulated bearing 100 includes outer ring 102, rolling elements 104, and aluminum insulating caps 106 and 108. The outer ring includes inner rolling surface 110 and the rolling elements are in rolling contact with the inner rolling surface. That is, rolling elements 104 are in contact with and roll on inner rolling surface 110.

The example bearing shown is a cylindrical roller bearing (CRB). Although rolling elements 104 are shown as cylinders, bearing 100 may include other rolling elements. For example, in other example embodiments, the rolling elements may be spherical, needle, or tapered rollers (not shown). Cage 112 positions and guides rolling elements 104 in a known manner.

The outer ring also includes outer spiral groove 114. Groove 114 may be added to outer ring 102 by hard turning and deburring, for example. Because groove 114 has a spiral shape, it does not completely cut through any cross section of the outer ring, reducing disruption to bearing outer diameter contact. Aluminum insulating cap 106 is screwed onto the outer ring from axial end 116 via inner spiral 118, complementary to the outer spiral groove. Similarly, aluminum insulating cap 108 is screwed onto the outer ring from axial end 120, opposite axial end 116 via inner spiral 122, complementary to the outer spiral groove. Insulating caps 106 and 108 are screwed onto the outer ring to secure the insulating caps to the outer ring. As can be seen in FIG. 5, for example, the outer spiral groove has a rectangular cross-section, but other embodiments (not shown) may include an outer spiral groove having a cross-section with another shape (e.g., triangle or trapezoid). In these cases, the inner spirals would have complementary triangle or trapezoid shapes, for example.

Aluminum insulating caps 106 and 108 are each hard coat anodized. By hard coat anodizing, we mean refining the aluminum insulating cap through electrolysis to form a dense anodic coating. In other words, hard coat anodizing produces a controlled oxide layer on anodized parts to improve abrasion and corrosion resistance, surface hardness, thermal and electrical insulation, gliding properties, and aesthetic qualities. It is the electrical insulating properties of hard coat anodizing that is important in this application. The aluminum insulating caps each have two layers of hard coat anodization, an inner layer and an outer layer. As stated above, the hard coat anodizing forms an oxidization layer. Here, the oxidization layer is between 40 μm and 60 μm thick. Insulated bearing 100 may also include an insulating epoxy between each of the aluminum insulating caps and the outer ring to further enhance the insulation properties of bearing 100. The insulating epoxy may be two part Master Bond® EP110F8-1 or Loctite® EA 3336 applied to the outer spiral groove before installing the aluminum insulating caps, for example.

Aluminum insulating cap 106 includes cylindrical portion 124 and annular portion 126. Inner spiral 118 protrudes radially inward from cylindrical portion 124 and annular portion 126 extends radially inward from cylindrical portion 124. Similarly, aluminum insulating cap 108 includes cylindrical portion 128 and annular portion 130. Inner spiral 122 protrudes radially inward from cylindrical portion 128 and annular portion 130 extends radially inward from cylindrical portion 128. Outer ring 102 includes axially opposite annular surfaces 132 and 134, and each of the aluminum insulating caps is screwed onto the outer ring until the respective annular portion contacts a one of the axially opposite annular surfaces. For example, cap 106 is screwed until annular portion 126 contacts annular surface 132, and cap 108 is screwed until annular portion 130 contacts annular surface 134. That is, because the groove is a spiral, as the insulating cap rotates relative to the outer ring, the cap is axially translated across the outer ring until portions 126 and 130 contact surfaces 132 and 134, respectively, ensuring a tight fit between two components. In addition to the outer spiral groove, insulating epoxy may also be applied to the axially opposite annular surfaces prior to installing the aluminum insulating caps, for example.

Cap 106 includes distal overlap portion 136 and cap 108 includes distal underlap portion 138. Portions 136 and 138 cooperate to provide a mating joint between the aluminum insulating caps. Insulated bearing 100 may also include inner ring (not shown) with outer rolling surface (not shown). Rolling elements 104 are in rolling contact with the outer rolling surface. That is, rolling elements 104 are in contact with and roll on the outer rolling surface of the inner ring.

Bearing 100 may be installed, or seated, in a housing bore (not shown) and insulated from the housing by insulating caps 106 and 108. The insulating caps may have a slip fit with the non-rotating housing, for example. The caps fully insulate the bearing. In other words, insulating caps 106 and 108 electrically insulate bearing outer ring 102 from the housing and/or a shaft (not shown) to prevent damage from electrical current flowing through raceways in the outer and inner rings through the rolling elements of bearing 100. Allowing current to flow may cause arcing, pitting or other damage to the bearing. This damage roughens contact surfaces between the raceways and rolling elements, eventually leading to failure. An insulated bearing is important to prevent electrical discharge machining (EDM) of bearings for electric motors and/or electric axles where automatic transmission fluid (ATF) is present, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Insulated bearing
102 Outer ring
104 Rolling elements
106 Aluminum insulating cap (first)
108 Aluminum insulating cap (second)
110 Inner rolling surface
112 Cage
114 Outer spiral groove
116 Axial end (first)
118 Inner spiral (cap 106)
120 Axial end (second)
122 Inner spiral (cap 108)
124 Cylindrical portion (cap 106)
126 Annular portion (cap 106)

128 Cylindrical portion (cap 108)
130 Annular portion (cap 108)
132 Annular surface (first)
134 Annular surface (second)
136 Distal overlap portion (cap 106)
138 Distal underlap portion (cap 108)

What is claimed is:

1. An electrically insulated bearing, comprising:
an outer ring comprising an inner rolling surface and an outer spiral groove;
a plurality of rolling elements in rolling contact with the inner rolling surface;
a first aluminum electrically insulating cap screwed onto the outer ring from a first axial end, the first aluminum electrically insulating cap comprising a first inner spiral, complementary to the outer spiral groove; and
a second aluminum electrically insulating cap screwed onto the outer ring from a second axial end, opposite the first axial end, the second aluminum electrically insulating cap comprising a second inner spiral, complementary to the outer spiral groove, and
an insulating epoxy between each of the aluminum electrically insulating caps and the outer ring.

2. The electrically insulated bearing of claim 1, wherein the outer spiral groove comprises a cross-section having a shape selected from the group consisting of a rectangle, a triangle, and a trapezoid.

3. The electrically insulated bearing of claim 1, wherein the first aluminum electrically insulating cap and the second aluminum electrically insulating cap are each hard coat anodized.

4. The electrically insulated bearing of claim 3, wherein the first aluminum electrically insulating cap and the second aluminum electrically insulating cap each comprise two layers of hard coat anodization.

5. The electrically insulated bearing of claim 4, wherein the two layers are an inner layer and an outer layer.

6. The electrically insulated bearing of claim 3, wherein the hard coat anodization forms an oxidization layer.

7. The electrically insulated bearing of claim 6, wherein the oxidization layer is between 40 μm and 60 μm thick.

8. The electrically insulated bearing of claim 1, wherein the insulating epoxy is applied to the outer spiral groove.

9. The electrically insulated bearing of claim 1, wherein each aluminum electrically insulating cap comprises:
a cylindrical portion, the inner spiral protruding radially inward therefrom; and
an annular portion extending radially inward from the cylindrical portion.

10. The electrically insulated bearing of claim 9, wherein:
the outer ring comprises axially opposite annular surfaces; and
each of the aluminum electrically insulating caps is screwed onto the outer ring until the respective annular portion contacts a respective one of the axially opposite annular surfaces.

11. The electrically insulated bearing of claim 10, wherein the insulating epoxy is applied to the outer spiral groove and each of the axially opposite annular surfaces.

12. The electrically insulated bearing of claim 1, wherein each of the plurality of rolling elements is a cylinder, a sphere, a needle, or a tapered roller.

13. The electrically insulated bearing of claim 1, wherein:
the first aluminum electrically insulating cap further comprises a distal overlap portion;
the second aluminum electrically insulating cap further comprises a distal underlap portion; and
the distal overlap portion and the distal underlap portion cooperate to provide a mating joint between the first aluminum electrically insulating cap and the second aluminum electrically insulating cap.

14. An electrically insulated bearing, comprising:
an outer ring comprising an inner rolling surface and an outer spiral groove;
a plurality of rolling elements in rolling contact with the inner rolling surface;
a first aluminum electrically insulating cap screwed onto the outer ring from a first axial end, the first aluminum electrically insulating cap comprising a first inner spiral, complementary to the outer spiral groove; and
a second aluminum electrically insulating cap screwed onto the outer ring from a second axial end, opposite the first axial end, the second aluminum electrically insulating cap comprising a second inner spiral, complementary to the outer spiral groove, and
wherein the first aluminum electrically insulating cap overlaps with the second aluminum electrically insulating cap.

15. An electrically insulated bearing, comprising:
an outer ring comprising:
an inner rolling surface;
an outer spiral groove; and
axially opposite annular surfaces;
a plurality of rolling elements in rolling contact with the inner rolling surface;
a first electrically insulating cap having a first inner spiral configured to cooperate with the outer spiral groove so as to secure the first electrically insulating cap to the outer ring; and
a second electrically insulating cap having a second inner spiral configured to cooperate with the outer spiral groove so as to secure the second electrically insulating cap to the outer ring, and
each electrically insulating cap comprises:
a cylindrical portion, the inner spiral protruding therefrom; and
an annular portion extending radially inward from the cylindrical portion; and
each of the electrically insulating caps is screwed onto the outer ring until the respective annular portion directly contacts a respective one of the axially opposite annular surfaces; and
the first electrically insulating cap and the second electrically insulating cap prevent electrical current to flow into the outer ring via an anodized layer formed on the first electrically insulating cap and an anodized layer formed on the second electrically insulating cap.

* * * * *